United States Patent Office 2,898,324
Patented Aug. 4, 1959

2,898,324

INDUSTRIAL ADHESIVE BONDING AGENT COMPRISING LIQUID MELAMINE MODIFIED UREA FORMALDEHYDE RESIN

Harold A. Mackay, New Brunswick, N.J., assignor to Catalin Corporation of America, a corporation of Delaware No Drawing. Application April 2, 1956
Serial No. 575,373

7 Claims. (Cl. 260—67.6)

This invention relates to the manufacture of a liquid melamine modified urea formaldehyde resin that is particularly adapted for use as an industrial adhesive bonding agent.

I have now discovered that if melamine is condensed with a urea formaldehyde resin and the condensation recation is initiated at a time when the urea formaldehyde resin is in the form of a linear polycondensate having available methylol groups, then the resulting liquid resin is so stable that it will not gel even after standing over prolonged periods of time. The liquid resinous product is particularly useful as an industrial adhesive bonding agent as for example in the manufacture of plywood laminates and it enables the user to employ the resin in liquid form and use it up as he goes along without making a fresh batch every day, as is necessary with the ordinary resins now in use. An important advantage of my resinous product is that adhesive bonds made with my resin have exceptionally high resistance to water.

Another advantage of my melamine modified urea formaldehyde polycondensate is that it readily responds to the action of certain stabilizers which can be incorporated with my liquid resin in a water system as distinguished from the alcohol environment required for resins made in accordance with prior art methods. The stabilizers so effect stability of my resin against gelation that it may be shipped in commerce in liquid form ready for use. As used herein the term "stabilizer" means the known additives ordinarily used in the art to stabilize solutions of melamine resins against gelation. The term "liquid resin" as used throughout this specification is intended to mean a resin that is formed in the presence of water and is either dissolved or dispersed in a certain amount of water so that the resulting product is in liquid form.

Throughout this specification I describe the preferred form of my invention which is a melamine modified urea formaldehyde resin but it wil be understood that other amino-azine or diamide compounds can be used in place of melamine or in combination with melamine. Although the melam, amelin, monochloromelamine, formoguanamine and cyanoguanidine modified urea formaldehyde resins are not as interesting commercially as the melamine urea formaldehyde resin, they may otherwise be considered equivalent to melamine. Guanidine and dicyandiamide may be used in place of melamine with substantially the same results.

In order to achieve my resinous product is not enough to just mix the ingredients as the melamine must be reacted with the urea formaldehyde resin. Accordingly it is extremely important to add melamine to the urea formaldehyde reaction liquid at the time or immediately after the time that the urea resin passes from the infinitely water soluble methylol stage into the hydrophobic stage as hereinafter defined and at a time when the urea resin is still capable of further linear polycondensation through methylol groups. This stage in the urea formaldehyde condensation reaction is readily determined by testing for cloud point of the reaction liquid in water. When a sample of the urea formaldehyde reaction liquid first shows a cloud in ice water (0. C.) at infinite dilution, the melamine may then be added to the reaction liquid and it may be added up to the time that one part of reaction liquid shows a definite cloud in 5 parts of water at 10° C. (parts are calculated on volume basis). If the melamine is added before a sample of the urea formaldehyde reaction liquid produces a cloud in ice water at infinite dilution, then the urea resin is in the methylol stage without hydrophobic characteristics and the resulting liquid resin product will not have the desired stability and the product may gel in a matter of 24 hours. If melamine is added after the reaction has progressed to the point where one part of reaction liquid shows a definite cloud in 5 parts of water at 10° C. then the urea resin is so completely hydrophobic that it is incapable of further linear polycondensation through methylol linkage and the melamine will not react and polymerize with the urea resin to the extent necessary for forming my liquid resinous condensate. Water tests for cloud point are well known in the resin art and as is known the test may be carried out at different temperatures with different amounts of water to determine the stage in the urea formaldehyde condensation reaction specified hereinabove for the addition of melamine.

In accordance with my invention, a condensation reaction is started in ordinary manner with urea and a commercial grade of formaldehyde (37%) and the reaction is continued until the resulting liquid becomes hydrophobic to the extent that a sample of reaction liquid shows a cloud at infinite dilution in ice water (0° C.) and then the liquid is neutralized and melamine and additional formaldehyde are added to the kettle. Thereafter the condensation reaction is continued to the desired end point and the finished liquid resin is neutralized and dehydrated preferably under vacuum to the desired solids content. I have achieved excellent results by continuing the condensation reaction until a sample of the liquid resin shows turbidity at infinite dilution in water at 25° C. At this time the liquid resinous reaction mass has limited compatibility with added water and is characterized by the fact that the aqueous dispersion of the resin exhibits a definite opalescence. If the resin is to be shipped in commerce in liquid form, it is preferable to mix a stabilizing agent with the resin before it is shipped.

In describing my invention the formaldehyde is preferably added to the kettle in two separate portions. Part of the formaldehyde is added with the urea and part is added along with the melamine. This is not critical and all of the formaldehyde may be added along with the urea. As a practical matter, however, the formaldehyde is usually added in increments as described, since this materially reduces reaction time and gives better control of the reaction.

As to proportions of ingredients, I have achieved excellent results using the following proportions:

A. Mol ratio urea to formaldehyde in initial condensation reaction mass:

For each mol of urea about 1.5 to 3.0 mols of formaldehyde. Preferred ratio 1 mol urea to about 2.1 mols formaldehyde.

B. Mol ratios in final reaction mass:

(1) In final reaction mass for each mol of urea plus melamine about 1.5 to 3.0 mols of formaldehyde. Preferred ratio for each mol of urea plus melamine about 1.9 to 2.25 mols of formaldehyde.

(2) In final reaction mass for each mol of melamine about 1.5 to 40.0 mols urea. Preferred ratio 1.0 mol of melamine to about 2.0 to 17.0 mols of urea.

Considering now the conditions under which my condensation reaction is carried out: As is customary in the art, condensation of the urea and formaldehyde may be carried out either in an acid or alkaline environment, and, of course, it is preferable to heat the reaction mixture since it proceeds much more rapidly at slightly elevated temperatures. For best results I prefer to adjust the pH of the urea formaldehyde condensation reaction mixture to a value between about 6 to 10 and to maintain the temperature of the reflux at about 80° to 102° C. Condensation of melamine with the urea formaldehyde resin is best carried out at a temperature of about 80° C. to 102° C. and the condensation reaction should be started out at a pH of about 6 to 10 and preferably at a pH of about 6.5 to 10.0. If the urea condensation reaction is started in a definitely acid environment at low mol ratios some of the urea resin may be precipitated out as methylene urea. The same is true of the melamine stage of our condensation reaction and if it is started in a definite acid environment at low mol ratios some of the melamine may be precipitated out. Otherwise the pH of the reaction mass and the temperature at which the reaction is carried out may be adjusted to existing manufacturing operations and need not be within the range specified. The pH adjustments may be made with any of the acid or alkali materials customarily employed in the art.

In working with my resin, I found that the stability of the liquid resin of my invention is materially increased when stabilizers are mixed with the resin. The effect of these on stability is truly surprising, and in some cases stability of the liquid resin increases to about 50 times that of the same resin without stabilizer. The stabilizing agents that I have used are methanol, diethylene glycol, triethylene glycol di-2-ethyl hexoate, aryl sulfonamides and alcohols having a furane ring such as furfuryl alcohol and furfural. The amount of stabilizing agent that may be employed will vary depending upon contemplated use of the final product. In general, I prefer to use between about 0.1 to 10% of stabilizing agent based on the weight of liquid resin containing about 60 to 65% solids by weight. In this connection it is to be noted that stability of my liquid resin decreases as the ratio of melamine to urea in the resin increases and where a resin stability of more than two months is desired the amount of melamine in the resin should be less than 70 parts by weight of melamine to 30 parts by weight of urea within the specified mol ratio limits.

The following specific examples further illustrate my invention. It will be understood that the examples are only given for the purpose of illustration and that my invention is not limited thereto. In the examples and throughout the specification, unless stated to the contrary, percentages and parts are calculated on a weight basis.

EXAMPLE I 752 parts of urea (12.5 mols) and 2000 parts of 37% formaldehyde (24.78 mols) are mixed at 25° C. in a suitable reaction kettle, for example, a steam jacketed stainless steel kettle equipped with reflux condenser, agitator and vacuum distillation apparatus. The pH of the solution is adjusted to a value between 6.0 and 10.0 with a suitable base such as trimethylamine. The solution is heated to reflux and the reactants condensed (temperature of condensate about 80 to 102° C.) until a sample of the condensate shows a cloud in ice water at infinite dilution. At this point the reaction mass is neutralized with sodium hydroxide to a pH of about 6.5 to 10.0 and 502 parts of melamine (3.99 mols) and 1000 parts of 37% formaldehyde (12.39 mols) are then added to the kettle. After adding the melamine and formaldehyde the total mol ratio of the ingredients in the kettle is urea 3.13 mols, melamine 1.0 mol, and formaldehyde 9.3 mols. The reactants are again heated to reflux and condensed (temperature about 85° C.) until a sample of the liquid resin shows turbidity at infinite dilution in water at 25° C. The reaction mass is then neutralized by adjusting the pH to a value between about 7.5 to 9.5 and thereafter dehydrated under vacuum (55–60° C. full vacuum 28″ mercury) to the desired solid content, preferably 60–65%. A sample of the liquid resin held at 25° C. did not show any sign of gelation for ten days, whereas a sample of liquid resin having the same mol ratio of ingredients and the same percent of solids made by physically mixing a liquid melamine and a liquid urea formaldehyde resin gelled within 24 hours after it was made.

Using the procedure specified in Example I melamine modified urea formaldehyde resins were made with the following proportions of ingredients. In Example VII all of the formaldehyde was present in the initial reaction mass and melamine alone was added to form the final reaction mass. In the other examples additional formaldehyde was added along with the melamine to form the final reaction mass.

*Mol ratio*

| Example | Urea to Formaldehyde, Initial Condensation | Urea Plus Melamine to Formaldehyde in Final Reaction Mass | Melamine to Urea, Final Reaction Mass |
|---|---|---|---|
| 2 | 1 to 2.20 | 1 to 2.25 | 1 to 2.10 |
| 3 | 1 to 2.20 | 1 to 2.25 | 1 to 1.75 |
| 4 | 1 to 1.50 | 1 to 1.67 | 1 to 2.10 |
| 5 | 1 to 1.50 | 1 to 2.23 | 1 to 2.10 |
| 6 | 1 to 3.00 | 1 to 2.67 | 1 to 2.10 |
| 7 | 1 to 2.00 | 1 to 1.92 | 1 to 23.10 |
| 8 | 1 to 2.10 | 1 to 2.24 | 1 to 8.50 |
| 9 | 1 to 1.50 | 1 to 1.50 | 1 to 20.00 |
| 10 | 1 to 1.50 | 1 to 2.77 | 1 to 20.00 |

EXAMPLE XI 6630 parts (82 mols) of 37% formaldehyde and 2400 parts of urea (40 mols) are placed on a suitable reaction kettle as in Example I. The reactants are heated up to 25° C. and neutralized with caustic soda to a pH of about 8.5 to 9.0. Heat is then used to obtain reflux and the reactants are condensed at about 100° C. for 30 minutes after which the pH of the condensate is adjusted with phosphoric acid to about 5.1 to 5.4 and the reaction continued at reflux until a sample of the condensate at infinite dilution in ice water shows a cloud. At this time the pH is adjusted with sodium hydroxide to a value of about 7.5 to 8.5. 126 parts of melamine (1.0 mol) is added to the neutralized resinous mass and the poly-condensation allowed to proceed at 97° to 102° C. until one part of resin when mixed with 7 parts of water at 25° C. produces a permanent cloud. The condensation stage is considered finished and the reaction mass is neutralized to a pH of about 7.0 to 8.0 with sodium hydroxide and concentrated to 60% resin solids by vacuum distillation. At 60° C. 24 parts by weight of triethylene glycol di-2-ethylhexoate are added to the resin and after proper dispersion, the finished product is cooled to 30° C. A sample of the liquid resin held at 25° C. did not gel for a period of 6½ months.

EXAMPLE XII 2600 parts of 37% formaldehyde (33.4 mols) are placed in a suitable reaction kettle as in Example I. The formaldehyde is neutralized with sodium hydroxide to a pH value of about 7.0 to 7.5. 668 parts of urea (11.11 mols) are dissolved in the formaldehyde and the mixture heated to reflux in about 30 minutes. After refluxing for 15 minutes, the condensate is adjusted to a pH value of about 4.5 to 4.7 with phosphoric acid and the reaction mass condensed at reflux until a sample of the condensate at infinite dilution in ice water produces a cloud point. At this stage, the reaction mass has the desired hydrophobic characteristics and is neutralized with caustic soda to a pH value of about 7.0 to 7.5. 126 parts of melamine (1 mol) is added to the neutralized resinous mass and the whole condensed at reflux to a measured hydrophobe obtained by mixing one part of resin with 5 parts of water at 25° C. The resin is then neutralized with tetraethanol ammonium hydroxide to a pH value of about 7.0 to 8.0. After neutralization 70 parts of tetrahydrofurfuryl alcohol are added to the resinous mixture and the whole concentrated by vacuum distillation to 60% solids content. A sample of resin prepared in this manner did not gel for a period of 8 months at 25° C.

EXAMPLE XIII 3170 grams of 37% formaldehyde (39.6 mols) is placed in a suitable reaction kettle as in Example I. 1134 grams of urea (18.9 mols) are then added to the kettle and the materials heated to 25° C. Upon solution, the mixture is neutralized with sodium hydroxide to a pH of 8.5 to 9.0 and heated to reflux 97° to 102° C. After condensing for 30 minutes, the condensate is adjusted with formic acid to a pH of about 5.1 to 5.4. Refluxing is continued until a drop of the condensate shows a cloud point in ice water at infinite dilution. At this point the condensate is neutralized with sodium hydroxide to a pH of about 7.0 to 7.5 and 126 parts of melamine (1 mol) added to the system. The polycondensation is allowed to continue at reflux temperatures until one part of the resin when mixed with four parts of water at 25° C. produces a permanent cloud point. At this hydrophobic end point, the resin is immediately neutralized with caustic soda to a pH of about 7.5 to 8.0 and then dehydrated under vacuum at 60° C. until a resin solids of 60% is obtained. 50 parts of paratoluenesulfonamide are added at 60° C. to the resinous mass and agitated until in solution after which the resin temperature is reduced to 25° C. A sample of resin produced according to the above procedure did not gel for a period of 8½ months at 25° C.

EXAMPLE XIV

The method of Example I was repeated with the same mol ratio of ingredients with the exception that initial condensation of urea and formaldehyde was carried out at a pH of about 6.5 to 7.5. After the liquid reaction mass had been dehydrated at 60° C. to 60 to 65% solids, 3 parts by weight of triethylene glycol di-2-ethylhexoate were added and the resin was then cooled to room temperature. The parts by weight of ethylhexoate were based on the weight of liquid resin containing 60 to 65% by weight of solids. A sample of the liquid resin held at 25° C. did not gel for 120 days.

EXAMPLE XV

The procedure of Example I was again repeated with the same mol ratio of ingredients with the exception that initial condensation of the urea formaldehyde was started at a pH of about 8 to 9 and when a sample of the reaction liquid formed a cloud in ice water at infinite dilution, the pH of the urea formaldehyde reaction mass was adjusted to a value of about 4.5 to 5.5 with formic acid. After the finished liquid resinous mass had been dehydrated to 60–65% solids and cooled to 50° C., 540 parts by weight of furfuryl alcohol based on weight of the liquid resin were added and the liquid was then cooled to room temperature. A sample of the liquid resin held at 25° C. did not gel for 452 days.

EXAMPLE XVI

To a sample of the liquid resin made in Example I, 150 parts by weight (based on weight of liquid resin containing about 60 to 65% solids) of paratoluene sulfonamide were added to the liquid resin at 60° C. The liquid was then allowed to cool and a sample of the liquid held at 25° C. did not gel for 210 days.

EXAMPLE XVII

The procedure of Example XIII was again repeated with the same mol ratio of ingredients. After the finished liquid resin had been dehydrated to 60% solids, it was cooled to about 60° C. and 50 parts of methanol were added and the liquid was then cooled to room temperature. A sample of the liquid held at 25° C. did not gel for 654 days.

EXAMPLE XVIII

The procedure of Example XIII was again repeated with the same mol ratio of ingredients. After the finished liquid resin had been dehydrated to 60% solids it was cooled to about 60° C. and 55 parts of diethylene glycol were added and the liquid was then cooled to room temperature. A sample of liquid held at 25° C. did not gel for 385 days.

Stability of the liquid resins produced as set forth in Examples II through X far exceeded that of the known melamine modified urea formaldehyde resins made in accordance with ordinary procedures and in all cases the addition of between 3 to 5% of paratoluene sulfonamide based on weight of a sample liquid resin containing about 60 to 65% solids by weight gave a product that was stable at 25° C. for about three months and in some cases up to about one year.

The stabilizer was added to the liquid resinous product after the dehydration step while the liquid was still warm and at a temperature of about 60 to 65° C. The stabilizer was mixed with the liquid resin with gentle agitation and then the finished liquid product was allowed to cool to room temperature. The exact time of adding the stabilizer is not critical but for convenience of manufacture I prefer to add the stabilizer after the dehydration step and before the resin is cool.

Liquid resinous products made in accordance with my invention may be shipped in liquid form and cured with heat and pressure or cured at room temperature with an acid catalyst.

Although my liquid resinous product is particularly useful in connection with plywood laminates, it will be understood that its use is not limited thereto. For example, my resin is practically odorless and is excellent for use in foundry applications for core and shell molding. The resin gives excellent shakeouts and shows no burn, even on medium section gray iron that usually burns in with urea. Cores with my liquid resin have high scratch hardness values as compared to urea.

It will be understood that it is intended to cover all changes and modifications of the embodiment of my invention herein chosen for the purpose of illustration which do not constitute departures from the spirit and scope of my invention.

This application is a continuation-in part of my earlier copending application Serial No. 476,849, filed December 21, 1954, now abandoned.

What I claim is:

1. The method of making a liquid melamine urea formaldehyde resinous product which comprises the steps of forming an aqueous condensation reaction mixture consisting essentially of formaldehyde and urea in the proportion of about 1.5 to 3.0 mols of formaldehyde for each mol of urea, adjusting the pH of the reaction mixture with a base to a value between about 6.0 to 10.0, heating the reaction mixture to a temperature between about 80° C. to 102° C. to initiate a condensation reaction between the formaldehyde and urea, continuing such reaction at least to the stage where a sample of the reaction liquid forms a cloud in ice water at infinite dilution but short of the stage where one part of reaction liquid shows a definite cloud in five parts of water at 10° C. and then discontinuing the condensation reaction, adding melamine and additional formaldehyde to the reaction mixture, adjusting the pH of the reaction mixture with a base to a value between about 6.0 to 10.0, heating the reaction mixture to a temperature between about 80° C. to 102° C. to continue the condensation reaction and continuing the reaction to form a liquid resinous product of melamine urea and formaldehyde the additional formaldehyde being added in the proportion to give a final reaction mixture containing about 1.5 to 3.0 mols of formaldehyde for each mol of urea plus melamine and melamine being added in the proportion to give a final reaction mixture containing about 1.5 to 40.0 mols of urea for each mol of melamine.

2. The method of making a liquid melamine urea formaldehyde resinous adhesive which comprises the steps of reacting formaldehyde and urea in an aqueous condensation reaction mixture consisting essentially of urea and formaldehyde at a pH of about 6.0 to 10.0 and at a temperature of about 80° C. to 102° C. and in the proportion of about 1.5 to 3.0 mols of formaldehyde for each mol of urea, continuing such reaction at least to the stage where a sample of the reaction liquid forms a cloud at infinite dilution in ice water but short of the point where one part of reaction liquid shows a definite cloud in five parts of water at 10° C., and then discontinuing the condensation reaction, adjusting the pH of the reaction mixture with a base to a value between about 6.0 to 10.0, adding melamine and adjusting the total amount of formaldehyde supplied to the reaction mixture to give a final reaction mixture containing about 1.9 to 2.25 mols of formaldehyde for each mol of urea plus melamine and about 2.0 to 17.0 mols of urea for each mol of melamine and continuing the condensation reaction by heating the mixture to a temperature of about 80° C. to 102° C. to form a resinous adhesive of melamine, urea and formaldehyde.

3. The method specified in claim 1 which includes the step of adding to the liquid melamine urea formaldehyde resin a stabilizer capable of stabilizing solutions of melamine resin against gelation, said stabilizer being added in the proportion of about 0.1 to 10% by weight of liquid resin condensate to stabilize such resin against gelation.

4. The method of making a liquid melamine urea formaldehyde resinous adhesive which comprises the steps of reacting formaldehyde and urea in an aqueous condensation reaction mixture consisting essentially of urea and formaldehyde at a pH of about 6.0 to 10.0 and at a temperature between about 80° C. to 102° C. and in the proportion of between about 1.5 to 3.0 mols of formaldehyde for each mol of urea, continuing such reaction at least to the stage where a sample of the reaction liquid forms a cloud at infinite dilution in ice water but short of the point where one part of the reaction liquid shows a definite cloud in 5 parts of water at 10° C., discontinuing the condensation reaction, adjusting the pH of the reaction mixture to a value between about 6.0 to 10.0 and then adding melamine to the reaction mixture to establish the proportion of between about 1.5 to about 40 mols of urea for each mol of melamine and continuing the condensation reaction by heating the mixture to a temperature between about 80° C. to 102° C. until a sample of the liquid shows turbidity at infinite dilution in water at 25° C., to form a resinous adhesive of melamine, urea and formaldehyde.

5. A process as specified in claim 4 in which additional formaldehyde is added with the melamine said formaldehyde being added in the proportion to give a final reaction mixture containing about 1.5 to 3 mols of formaldehyde for each mol of urea plus melamine.

6. The method of making a liquid melamine urea formaldehyde resinous condensation produce which comprises the steps of forming an aqueous reaction mixture of formaldehyde and urea in the proportion of about 1.5 to 3.0 mols of formaldehyde for each mol of urea, adjusting the pH of the reaction mixture with a base to a value between about 6.0 to 10.0, heating the reaction mixture to a temperature between about 80° C. to 102° C. to initiate a condensation reaction between the formaldehyde and urea, continuing such reaction in the substantial absence of melamine at least to the stage where a sample of the reaction mixture forms a cloud in ice water at infinite dilution but short of the stage where one part of the reaction mixture shows a definite cloud in five parts of water at 10° C. and then discontinuing the reaction, adjusting the pH of the reaction mixture with a base to establish the pH at a value between 6.0 to 10.0, adding melamine to the reaction mixture in proportion to give a final reaction mixture containing about 1.5 to 40.0 mols of urea for each mol of melamine and containing about 1.5 to 3.0 mols of formaldehyde for each mol of urea, heating the reaction mixture to a temperature between about 80° C. to 102° C., to continue the condensation reaction until a sample of the liquid shows turbidity at infinite dilution in water at 25° C. and then discontinuing the condensation reaction and adjusting the pH with a base to a value between about 6 to 10 and thereafter heating the reaction mixture under vacuum to dehydrate it and form a liquid resinous condensation product of melamine, urea and formaldehyde.

7. The method as specified in claim 6 in which additional formaldehyde is added along with the melamine to form the final reaction mixture.

References Cited in the file of this patent

UNITED STATES PATENTS

| | | |
|---|---|---|
| 2,056,142 | Ripper | Sept. 29, 1936 |
| 2,287,756 | Brookes | June 23, 1942 |
| 2,328,424 | D'Alelio | Aug. 31, 1943 |
| 2,380,239 | Howald | July 10, 1945 |
| 2,548,416 | Barsky et al. | Apr. 10, 1951 |
| 2,797,206 | Suen et al. | June 25, 1957 |